US011195412B2

(12) United States Patent
Adetiloye

(10) Patent No.: US 11,195,412 B2
(45) Date of Patent: Dec. 7, 2021

(54) PREDICTING SHORT-TERM TRAFFIC FLOW CONGESTION ON URBAN MOTORWAY NETWORKS

(71) Applicant: Taiwo O Adetiloye, Irving, TX (US)

(72) Inventor: Taiwo O Adetiloye, Irving, TX (US)

( * ) Notice: Subject to any disclaimer, the term of this patent is extended or adjusted under 35 U.S.C. 154(b) by 0 days.

(21) Appl. No.: 16/930,640

(22) Filed: Jul. 16, 2020

(65) Prior Publication Data

US 2021/0020036 A1     Jan. 21, 2021

Related U.S. Application Data

(60) Provisional application No. 62/874,748, filed on Jul. 16, 2019.

(51) Int. Cl.
| | |
|---|---|
| *G08G 1/00* | (2006.01) |
| *G08G 1/01* | (2006.01) |
| *G06N 20/00* | (2019.01) |
| *G06K 9/00* | (2006.01) |
| *G08G 1/04* | (2006.01) |

(52) U.S. Cl.
CPC ....... *G08G 1/0141* (2013.01); *G06K 9/00771* (2013.01); *G06N 20/00* (2019.01); *G08G 1/0116* (2013.01); *G08G 1/0133* (2013.01); *G08G 1/04* (2013.01)

(58) Field of Classification Search
CPC ........ G08G 1/041; G08G 1/0116; G08G 1/04; G08G 1/0133; G06N 20/10; G06K 9/00771
See application file for complete search history.

(56) References Cited

U.S. PATENT DOCUMENTS

| | | | | |
|---|---|---|---|---|
| 10,671,076 B1 * | 6/2020 | Kobilarov | ............ | G05D 1/0255 |
| 2005/0209772 A1 * | 9/2005 | Yoshikawa | ........ | G01C 21/3492 |
| | | | | 340/995.13 |
| 2006/0122846 A1 * | 6/2006 | Burr | ........................ | G08G 1/20 |
| | | | | 342/357.31 |
| 2007/0135990 A1 * | 6/2007 | Seymour | ................ | G08G 1/081 |
| | | | | 701/117 |
| 2007/0208492 A1 * | 9/2007 | Downs | ................. | G08G 1/0104 |
| | | | | 701/117 |
| 2008/0088486 A1 * | 4/2008 | Rozum | ............ | G08G 1/096741 |
| | | | | 340/995.13 |

(Continued)

OTHER PUBLICATIONS

Taiwao O. Adetiloye,PhD: Predicting Short-Term Traffic Congestion on Urban Motorway Networks, Ph.D. thesis, Concordia University https://spectrum.library.concordia.ca/985249/.

*Primary Examiner* — Ojiako K Nwugo
(74) *Attorney, Agent, or Firm* — Gutwein Law; Greg N. Geiser

(57) ABSTRACT

A system and method for the prediction of vehicle traffic congestion on a given roadway within a region. In particular, the computer implemented method of the present disclosure utilize real time traffic images from traffic cameras for the input of data and utilizes computer processing and machine learning to model a predictive level of congestion within a category of low congestion, medium congestion, or high congestion. By implementing machine learning in the comparison of exemplary images and administrator review, the computer processing system and method steps can predict a more efficient real time congestion prediction over time.

16 Claims, 8 Drawing Sheets

(56) References Cited

U.S. PATENT DOCUMENTS

| | | | | |
|---|---|---|---|---|
| 2008/0094250 A1* | 4/2008 | Myr | ........................ | G08G 1/04 |
| | | | | 340/909 |
| 2013/0332057 A1* | 12/2013 | Moore | ............... | G01C 21/3676 |
| | | | | 701/118 |
| 2014/0365103 A1* | 12/2014 | Petrie | ................... | G08G 1/0133 |
| | | | | 701/118 |
| 2017/0270413 A1* | 9/2017 | Moreira-Matias | ..... | G06N 20/00 |
| 2020/0226922 A1* | 7/2020 | Hahn | ................... | G08G 1/0129 |
| 2020/0242858 A1* | 7/2020 | Meroux | ................. | G07C 5/085 |

\* cited by examiner $$\text{Predict} \quad V(t+15)$$

Predict class label
Low
Medium
High $$\text{Given} \quad V(t)$$
$$V(t-15)$$
$$V_{hist}(t)$$
$$V_{hist}(t+15)$$

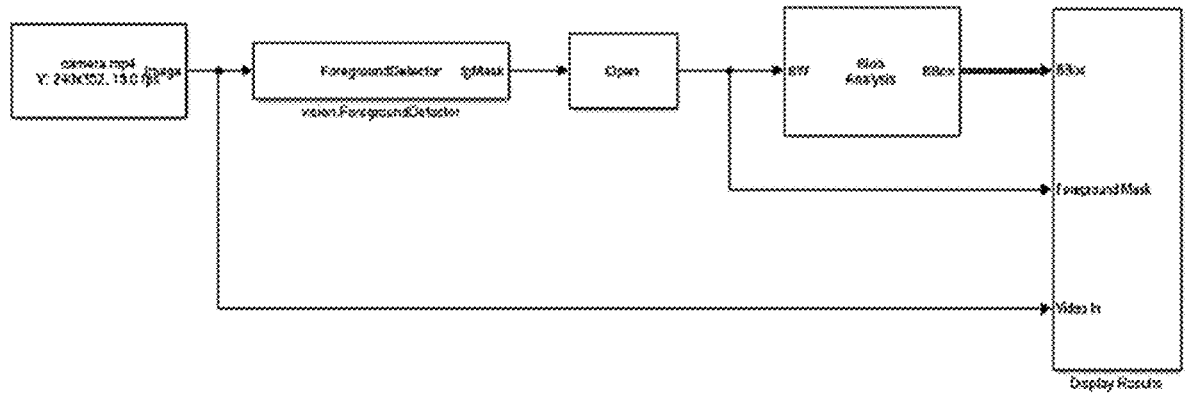

FIG. 9

1. Clone git repository and cd into the directory:
   git clone https://github.com/taiwotman/TensorflowPredictCongestionTypes.git
   cd TensorflowPredictCongestionTypes
2. Set up *virtualenv* with directory *venv*
   virtualenv venv
3. Activate *venv* using:
   source venv/bin/activate
4. Install tensorflow using:
   pip install tensorflow
5. Use traffic congestion image(supports only jpeg/jpg format)   e.g
   python run.py test_image/Aut10_010.jpg
6. Example output:
   high congestion (score = 0.70454)

FIG. 10

PREDICTING SHORT-TERM TRAFFIC FLOW CONGESTION ON URBAN MOTORWAY NETWORKS

CROSS-REFERENCE TO RELATED APPLICATION

This U.S. Patent application claims priority to U.S. Provisional Application: Application No. 62/874,748 filed Jul. 16, 2019, the disclosure of which is considered part of the disclosure of this application and is hereby incorporated by reference in its entirety.

FEDERALLY SPONSORED RESEARCH OR DEVELOPMENT

Not Applicable

SEQUENCE LISTING, A TABLE, OR A COMPUTER PROGRAM

Not Applicable

FIELD OF THE INVENTION

The present disclosure relates generally to a system and method to predict traffic congestion on urban roadways. More particularly, the system and method of the present disclosure utilizes machine learning to predict traffic congestion in real time based upon collected images from a plurality of traffic cameras.

BACKGROUND

Since the advent of the vehicle and the construction of roads, congestion has become a growing issue. With the growth of population centers and commuting, this congestion appears to be in continuous growth. Often, the congestion becomes so prevalent, that the vehicle traffic comes to a complete stop resulting in a traffic jam. This congested traffic causes a litany of problems, including, but not limited to, stress for users, air and noise pollution, unpredictable commuting times, accidents, and wasted time.

Accordingly, city managers and commuters are in a near constant battle to avoid this congestion through the use of a variety of solutions including, but not limited to, mass transit, road expansion/construction, dedicated high occupancy vehicle lanes, and incentives to prevent vehicle travel. Although these solutions are helpful, the cost of the congestion in the form of lost time, delay, and pollution requires additional solutions.

Within the prior art, one such popular solution is the use of a dedicated software application hosted on a personal electronic device that utilizes the global positioning system (GPS) of personal electronic device to communicate positioning to a network of user's for predicting the flow of traffic. Although this solution is useful, it requires participation by a plurality of users allowing for the collection and analysis of positioning data, location data, and movement of the device to provide accurate data in real time. Accordingly, this solution requires the user to forgo certain privacy protections to utilize all of the features of these dedicated applications.

Therefore, there exists a need in the market for additional and useful systems and method steps configured to predict traffic congestion in real time. Preferably, these systems and methods enable a user to alter their travel routes to a more amenable and free flowing option resulting in the savings of fuel and time. Still further, this preferred system and method utilizes publicly available data and does not intrude upon an individual user's privacy rights.

SUMMARY OF THE INVENTION

A system and method configured to solve the aforementioned challenges in the prediction of traffic congestion in real time. The system and method is most generally configured to collect image data from a plurality of cameras for processing to predict a traffic flow. The system and method is configured as an algorithm-based solution, which can learn and adapt from the environment it is being operated in, to predict traffic congestion patterns and interpret these patterns for placement within a congestion category as either high congestion, medium congestion, or low congestion. Accordingly, use of the system and method results in improved time savings, reduced pollution, and commuting stress. As the system learns from its environment (over a period of the time) image data and results are used to generate more efficient future results.

The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

BRIEF DESCRIPTION OF THE DRAWING(S)

FIG. 9 is a diagrammatic representation of the viptraffic Simulink traffic data obtained from the processor unit, according to the present disclosure; and FIG. 10 is a diagrammatic representation of the traffic congestion prediction using Tensorflow, according to the present disclosure.

DETAILED DESCRIPTION OF THE INVENTION

Figure 1:
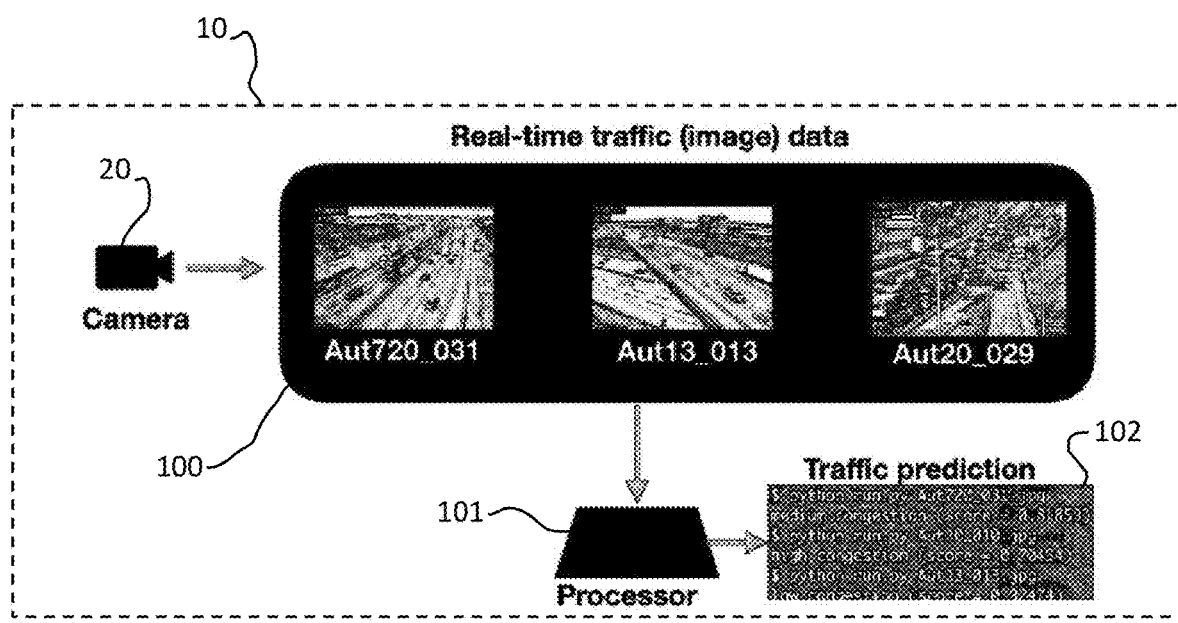
FIG. 1 is a modified wire frame diagram of the system and method, according to the present disclosure.
Figure 2:
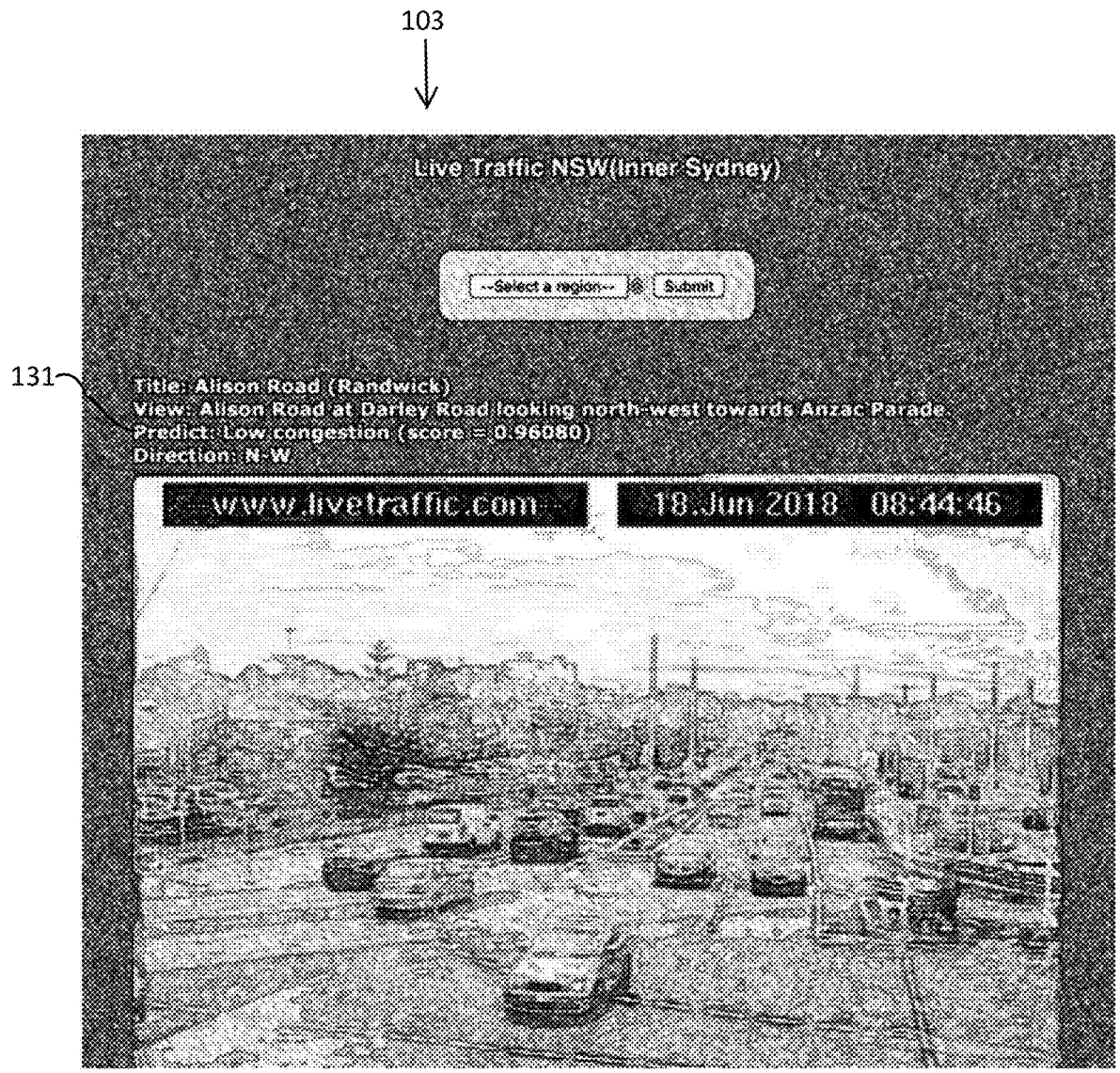
FIG. 2 is a simulated image of low traffic congestion, according to the present disclosure.
Figure 3:
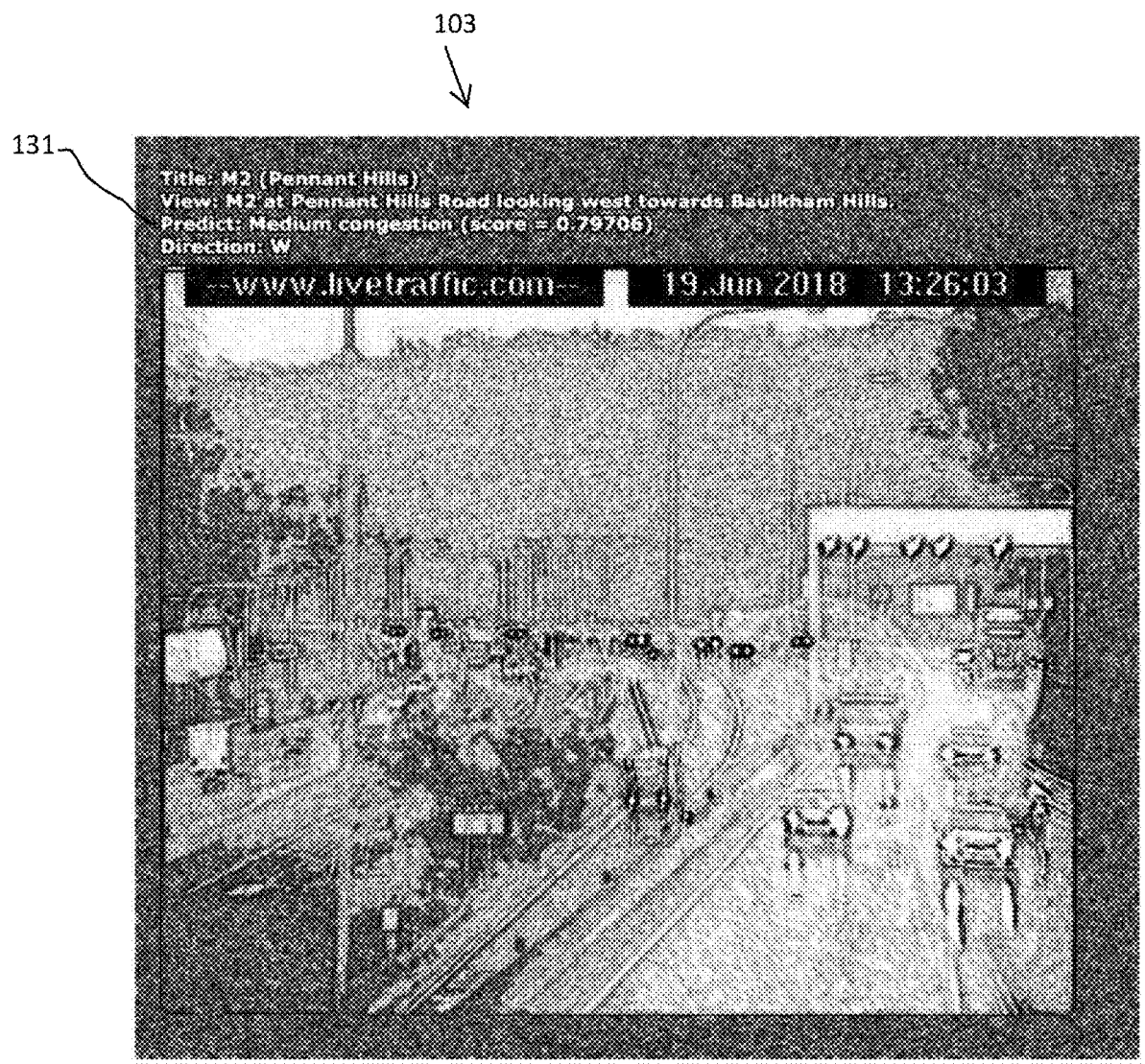
FIG. 3 is a simulated image of medium traffic congestion, according to the present disclosure.
Figure 4:
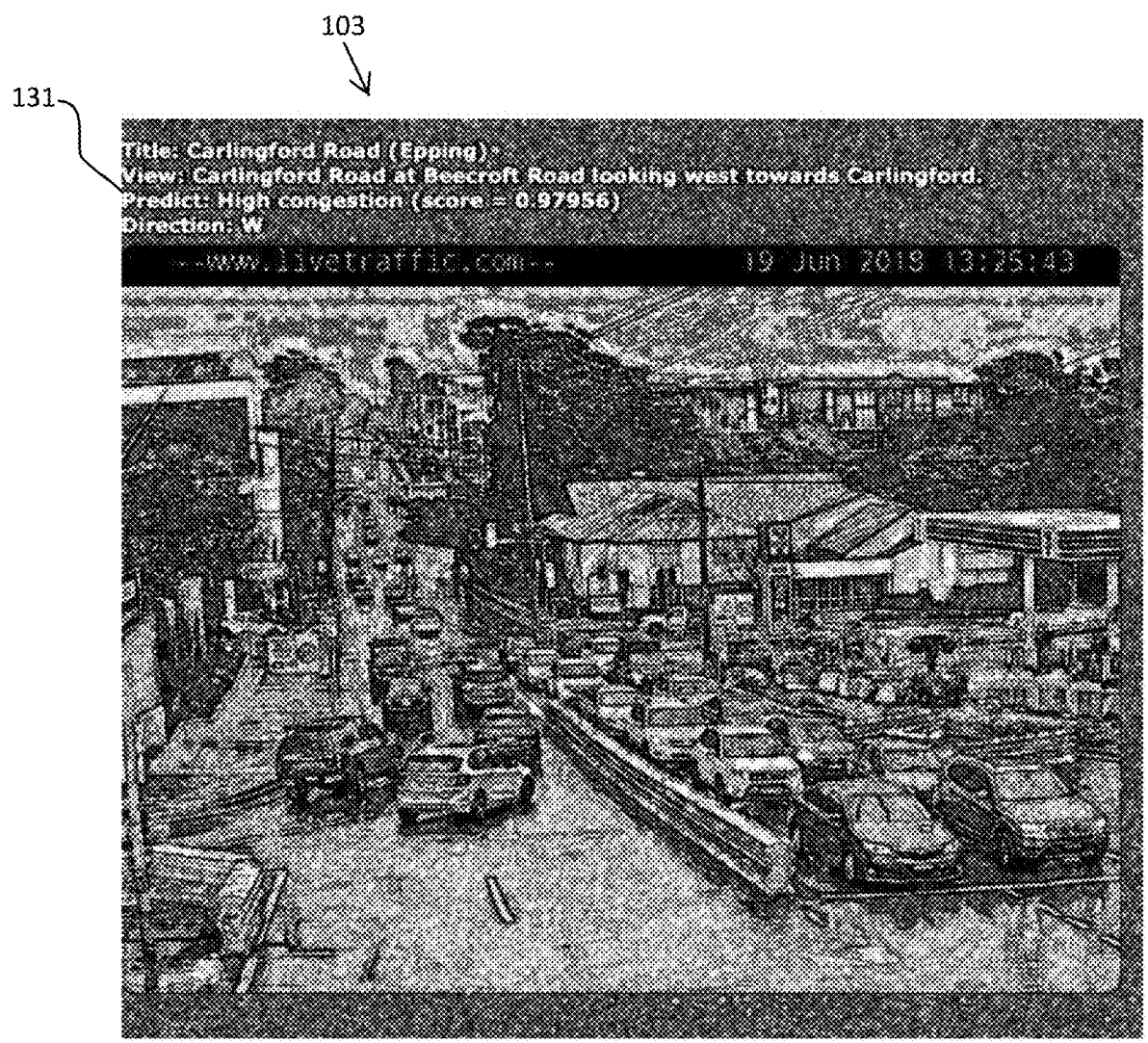
FIG. 4 is a simulated image of high traffic congestion, according to the present disclosure.
Figure 5:
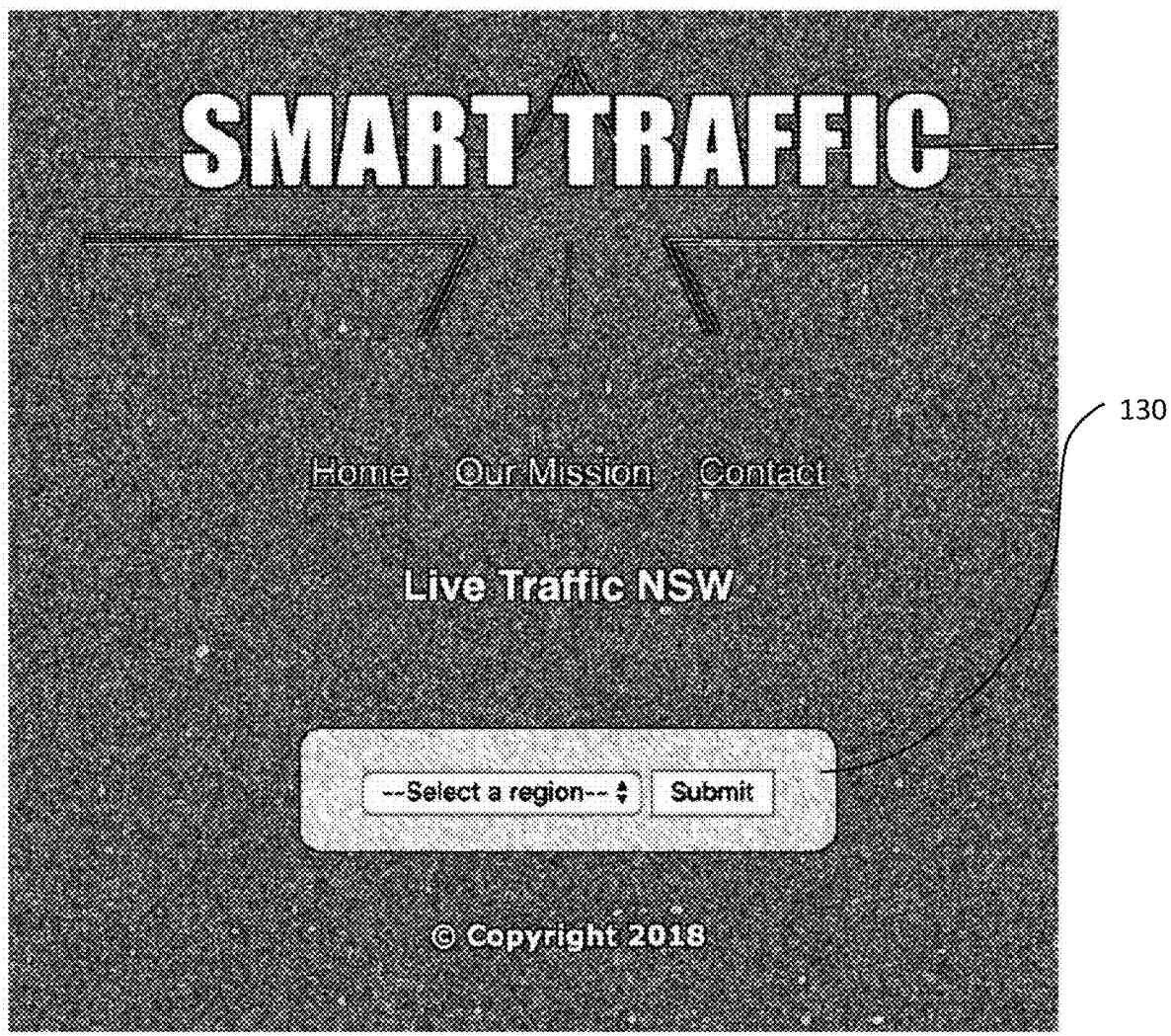
FIG. 5 is an exemplary graphical user interface for a user accessing the system and method, according to the present disclosure.
Figure 6:
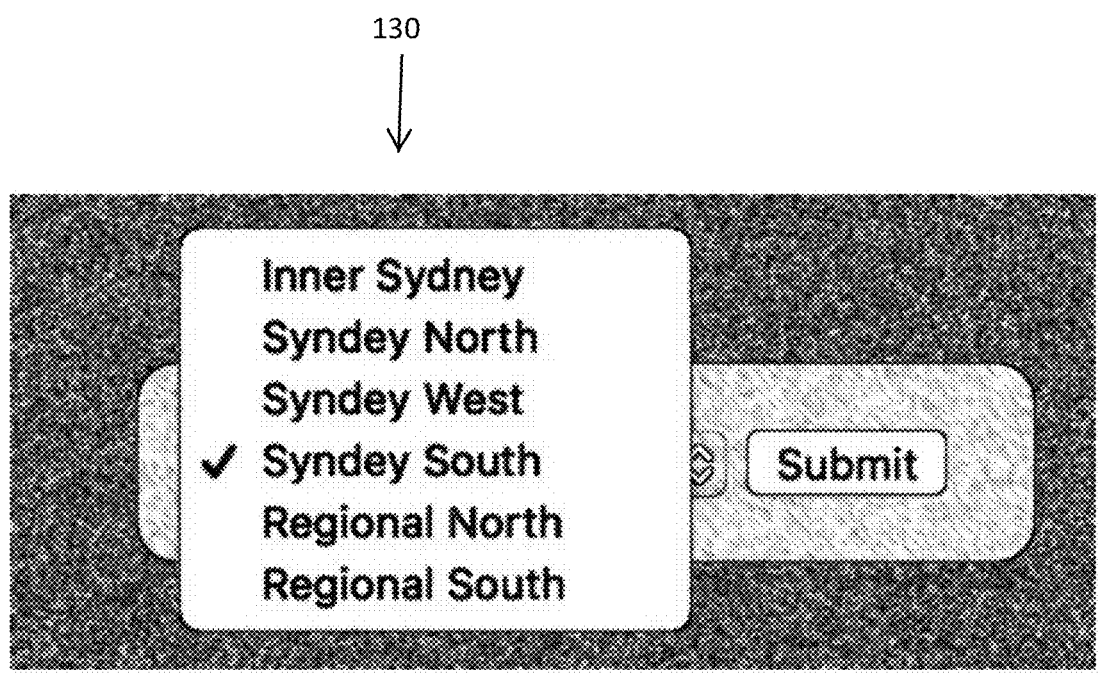
FIG. 6 is an exemplary graphical user interface showing regions of travel for the user when accessing the system and method, according to the present disclosure.

The following detailed description includes references to the accompanying figures, which form a part of the detailed description. The figures show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful and is not intended to exclude other embodiments from the scope of the invention.

As used herein, the term "coupled" means the joining of two members directly or indirectly to one another. Such joining may be stationary in nature or movable in nature and/or such joining may allow for the flow of fluids, electricity, electrical signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

The system and method of the present disclosure is most generally configured to provide a user with a predicted congestion level for vehicle traffic in real time through the execution of the method steps on hardware in the form of a plurality of computing devices and image capture devices to provide a resultant traffic congestion score based upon data entry, machine learning, and modeled data.

Referring specifically now to FIGS. 1-10 of the system and method of the present disclosure, generally in the form of a computing system, user interface, and method steps for the real time prediction of traffic congestion referred to as system and method 10.

The system and method 10 is most generally configured to collect and analyze images 100 of traffic in real time for the purpose of analyzing the congestion of a given and preselected roadway. Accordingly, the images 100 are generally accessed by the system and method 10 by interfacing with publicly available traffic cameras 20 through a dedicated application programming interface (API). The images 100 are then processed 101 and a prediction 102 generated and displayed to a user of the system and method 10 in the form of a traffic congestion score categorizing the traffic congestion as either high congestion, medium congestion, or low congestion.

The system and method 10 is configured in the form of logic for placement onto a server and hosted for access by the user, such as a commuter, wherein the user will interact with the system and method 10 through inputs within a graphical user interface (GUI) 103 accessed through a personal computing device of the user, such as, but not limited to, a personal electronic device, personal computing device, or dedicated application accessible on marketplace for installation onto a smart phone of the user.

The GUI 103 enables the user to select a dedicated region 130 within a larger geographic region, wherein traffic congestion within this region 130 will be processed 101 from at least one image 100 collected from the region 130 and a predicted traffic congestion score 131 displayed to the user of the system and method 10. In the preferred implementation of the system and method 10, the congestion score 131 will utilize a plurality of images 100 collected from a plurality of distinct cameras 20 for generating the traffic score 131.

The system and method 10 server functioning a repository for the logic and exemplary images and may be a cloud-based computing system hosted at a remote location or alternately placed onto a local computing machine or distributed between local and remote resources. Still further, this server may be present as a feature on an application accessible through a personal electronic device or the like to enable easy access to the user.

Accordingly, an exemplary situation utilizing the system and method 10 of the present disclosure can be used to illustrate how a given traffic congestion score 102 is generated. For example, a user will access the GUI 103 and select a region 130 of interest and based upon an anticipated location of travel for the user. The logic of the system and method 10 will then utilize the API to request images 100 of the current traffic within the region recorded from at least camera 20. The images 100 will then be processed 101 and an output generated in the form of the predicted traffic congestion score 102. Based upon this score 102, the user can then decide on the preferred route of travel.

The processing step 101 utilizes a neural network ("NN") and machine learning ("ML"), preferably through an open source program, such as TensorFlow, to learn from the exemplary images and successive images 100 over time to increase the veracity and accuracy of the processing 101 over time. Accordingly, the NN can be optimized and efficiency quantified by how accurately the NN predicts the congestion of a given image though continual review by an administrator of the system and method 10. Further, the NN can be trained using additional algorithms, such as, but not limited to, stochastic gradient descent or an evolutionary algorithm, to find the optimum set of weights for a given image 100 and predict a more accurate prediction score 102 requiring less and less administrator interaction over time.

The processing step 101 most generally utilizing the camera 20 images 100 in the form of static images, such as, but limited to a "JPEG" or "JPG" file formatted image, wherein these images are analyzed for their visual characteristics in the generation of a given score 102. These visual characteristics generally configured to generate a vehicle count based upon object detection and image pattern recognition, including, but not limited to, the distance between vehicles, number of headlights/brake lights, unoccupied space on a given roadway, number of vehicles, and other similar characteristics indicative of traffic patterns. These detected objects are then used by the processor 101 to generate textual data for the prediction 102, based upon regression models and classification models for traffic congestion.

Implementation of the system and method 10 of the present disclosure may additionally be in the form of a multi-threaded application as a microservice that can be added to a backend system hosted on the server. The system 10 uses method steps written in Python to generate the predicted score 102 in the form of the category of congestion. This predicted score 102 can be displayed as a numerical value within a range of 0 to 1.

Figures 7, 8:
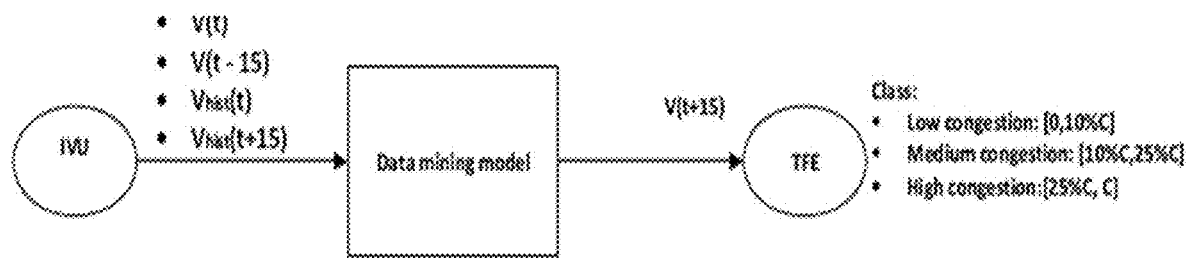
FIG. 7 is a diagrammatic representation of the data mining model with the input variable unit (IVU), according to the present disclosure.
FIG. 8 is a diagrammatic formal statement representation of FIG. 7, according to the present disclosure.

Further description of the system and method steps 10 can better be understood through the following exemplary data collection and processing steps enumerated in Predicting Short-Term Traffic Congestion on Urban Motorway Networks, Ph.D. thesis, Concordia University, by the above named inventor and herein incorporated by reference. Historically, traffic flow estimation (TFE) was modeled through traffic congestion patterns by predicting the short term traffic flow based on the volume or number of vehicles (V) passing a road section within a specific travel time interval (t) usually measured in hours (hr) or minutes (mins). FIG. 7 illustrates the generalized diagrammatic representation of our data mining model with the input variable unit (IVU) having input variables which consist of $v(t)$, $v(t-15)$, $v_{hist}(t)$ and $v_{hist}(t+15)$. These independent input parameters are defined as current volume and historical (subscript hist) average volumes with respect to the time under observation. In this case, the TFE predicts traffic congestion as high, medium, or low by estimating the model output within 15 mins intervals. Our classification models using neural networks (NN), random forest algorithm (RF), and deep belief network (DBN) seek to estimate the traffic congestion based on the number of vehicles or volume in a future time. Previous approaches seek to predict short term traffic flow using NN and non-parametric regression approaches. In order to generate volume predictions, the mapping model instinctively assume that there is a functional relationship between the given input input variables and the prediction variable $V(t+15)$, while using a clustering model to extract the cyclic nature of the traffic volume by utilizing the past cases having much similarity to the current one. Our contribution goes beyond the current approach by exploring the cyclic patterns while mapping the predictive value to either of the following class labels: low, medium and high congestion such that the volume range [25%, C]—high congestion, [10% C, 25% C]—medium congestion and [0, 10% C]—low congestion, where C represents the capacity of the road.

Accordingly, the revised formal statement is defined in FIG. 8.

This formal statement is then utilized to create the exemplary Intelligent Road Traffic Information Retrieval (IRTIR) system, generally indicated as system and method 10 utilizing the camera 20 images and processing 101 to detect accurate vehicle counts. The exemplary system and method 10 utilized a has a processor algorithmic unit that detects vehicle objects and obtains the counts within the view area of the camera. This was implemented in MATLAB using a Simulink vehicle counter called viptraffic. It employs Gaussian mixture models (GMMs) to estimate the background and produce a foreground mask using foreground detector model. This is in order to estimate the video sequence while highlighting the moving vehicle. The GMMs serve as a probabilistic model that assumes all the data points are generated from a mixture of a finite number of Gaussian distributions with unknown parameters. This is on the basis of incorporating information about the covariance structure of the data and the center of the latent Gaussians [80]. Full application details of this model for detection and counts of vehicles can be found on Mathworks. FIG. 9 shows the viptraffic Simulink diagrammatical representation. Thereafter, traffic data obtained from the processor unit 101 serves as input variables to the data mining models. Exemplary data was split in the ratio of 70 to 30 to make the training and test data.

Exemplary selected data mining models were implemented using Tensorflow and SparkMLlib. Tensorflow was used to develop our DBN model for image object classification and also implemented our RF, BP-NN and DBN using the SparkMLlib. Tensorflow is widely used for conducting machine learning research involving deep neural networks and has increasingly gain acceptance in wide variety of other domains. It is an open source library for numerical computation using data flow graphs in which the graph nodes represent mathematical operations, while the graph edges represent the multidimensional data arrays (tensors) communicated between them.

FIG. 10 illustrates the example of traffic congestion prediction using Tensorflow. The experiment is performed on a window's terminal. It is on the basis of applying deep neural network on input image data coming from real-time camera recording. This is to tell if the congestion is low, medium or high and to determine the model accuracy based on the 'score'. This provided count data that was then analyzed and utilized for the visualization of trends, verification of the model and validation of the results.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

What is claimed is:

1. A computer implemented method for the prediction of traffic congestion in real time for a user comprising:
    collecting input image data in the form of real time traffic images for a given region of travel selected by the user;
    analyzing the input image data to estimate a background of the collected image data;
    analyzing the background to create a foreground mask;
    using the foreground mask to detect vehicle objects to obtain a vehicle count;
    comparing the collected input image data vehicle count to exemplary image input data;
    predicting a level of traffic congestion within a category of congestion based upon the comparison;
    displaying the predicted level of traffic congestion to the user; and
    learning from the real time traffic images for future predictions.

2. The computer implemented method of claim 1, wherein the category of congestion is selected from the group of high congestion, medium congestion, and low congestion.

3. The computer implemented method of claim 1, wherein the method uses a computer processing system in the form of a multi-threaded application as a microservice and hosted on a backend system.

4. The computer implemented method of claim 1, wherein the method uses a computer processing system hosted on a cloud.

5. The computer implemented method of claim 1, wherein the learning is conducted on a neural network using TensorFlow.

6. A method for the prediction of traffic congestion in real time using a computer processing system, the method comprising:
    providing input data in the form of a real time image of traffic within a user selected region of travel;
    analyzing the input data to estimate a background of the real time image;
    analyzing the background to create a foreground mask;
    using the foreground mask to detect vehicle objects to obtain a vehicle count;
    using computer processing system to model a predictive level of congestion based upon the input data vehicle count and a plurality of exemplary images in the form of a category of congestion;
    using the computer processing system to index the real time image and the category of congestion for use in future predictive levels of congestion; and
    using the computer processing system with machine learning for use in the future predictive levels of congestion.

7. The method of claim 6, wherein the prediction of traffic congestion is generated through Python programming.

8. The method of claim 6, wherein the computer processing system is multi-threaded application as a microservice and hosted on a backend system.

9. The method of claim 6, wherein the computer processing system is hosted on a cloud.

10. The method of claim 6, wherein the machine learning is conducted on a neural network with TensorFlow.

11. The method of claim 6, wherein the category of congestion is selected from the group of low congestion, medium congestion, and high congestion.

12. A computer implemented method for the adaptive prediction of traffic congestion, the method comprising the steps of:
    using a computer processing system to allow a user to provide input data in the form of a region of travel of the user;
    using the computer processing system to request a real time image from at least one traffic camera within the region of travel;
    using the computer processing system to analyze the input image data to estimate a background of the collected image data;
    using the computer processing system to analyze the background to create a foreground mask;
    using the computer processing system to detect vehicle objects to obtain a vehicle count from the foreground mask;
    using the computer processing system to compare the vehicle count of the real time image to a plurality of exemplary images to generate a predicted category of congestion;
    using the computer processing system with a neural network to learn and translate based upon the comparison of the real time image and exemplary images in future traffic congestion predictions; and
    displaying the predicted category of congestion to the user.

13. The computer implemented method of claim 12, wherein the predictive traffic congestion is generated through Python programming.

14. The computer implemented method of claim 12, wherein the computer processing system is a multi-threaded application as a microservice and hosted on a backend system.

15. The computer implemented method of claim 12, wherein the computer processing system is hosted on a cloud.

16. The computer implemented method of claim 12, wherein the category of congestion is selected from the group of high congestion, medium congestion, and low congestion.

* * * * *